United States Patent [19]

Warner et al.

[11] Patent Number: 5,242,238
[45] Date of Patent: Sep. 7, 1993

[54] SHOCK ABSORBER BRACKET AND PIN

[75] Inventors: Joseph G. Warner, Sterling Heights; William M. Jones, Warren, both of Mich.

[73] Assignee: The United States of America as represented by the Secretary of the Army, Washington, D.C.

[21] Appl. No.: 812,329

[22] Filed: Dec. 23, 1991

[51] Int. Cl.⁵ ............................................. F16C 11/04
[52] U.S. Cl. .................................... 403/154; 403/161; 403/150; 280/705; 248/282; 411/169
[58] Field of Search ............... 403/154, 150, 151, 161, 403/162, 152, 163; 59/86; 188/321.11; 248/289.1, 282; 16/386, 380, 381; 411/169, 973, 114, 115, 140; 280/705, 663; 305/21, 24, 27, 28

[56] References Cited

U.S. PATENT DOCUMENTS

| | | | |
|---|---|---|---|
| 1,030,527 | 6/1912 | Nelson | 403/153 X |
| 3,371,940 | 3/1968 | Sinclair et al. | 280/705 X |
| 3,554,588 | 1/1971 | Reinsma et al. | 403/154 |
| 3,746,363 | 7/1973 | Borns | 280/661 X |
| 4,237,949 | 12/1980 | Wagner | 411/140 |
| 4,267,896 | 5/1981 | Hendriksen | 280/661 X |
| 4,385,418 | 5/1983 | Loftis et al. | 16/381 |
| 4,513,833 | 4/1985 | Sheldon | 280/705 X |
| 5,088,881 | 2/1992 | Bau et al. | 403/162 X |

FOREIGN PATENT DOCUMENTS 512175  8/1939  United Kingdom ............... 403/120

Primary Examiner—Randolph A. Reese
Assistant Examiner—Harry C. Kim
Attorney, Agent, or Firm—Peter A. Taucher; David L. Kuhn

[57] ABSTRACT

The invention is an improved assembly of a bracket and pin for connecting a shock absorber to the road arm of a vehicle.

9 Claims, 3 Drawing Sheets

SHOCK ABSORBER BRACKET AND PIN

GOVERNMENT USE

The invention described herein may be manufactured, used and licensed by or for the U.S. Government for governmental purposes without payment to us of any royalty thereon.

BACKGROUND

Many military vehicles such as the U.S. Army's Light Armored Vehicle (LAV) have wheels mounted on road arms that pivot up and down in a plane parallel to the side of the vehicle. Shock absorbers are mounted between the road arms and the vehicle, the shock absorbers being connected to the road arms by assemblies of brackets and pins. The pins are oriented along an outboard-to-inboard axis and have means at either end to prevent their translation out of the brackets. The brackets and pins are in a crowded space, one constraint being that the inboard side of the bracket is closely spaced from and parallel to an outboard surface of a vehicle chassis element. Because of the crowded space, replacing a shock absorber requires lifting the vehicle on a hoist, removing a tire and wheel spider and removing the bracket from the road arm. The shock absorber impairs access to the bolts fixing the bracket to the road arm, whereby proper torquing of the bolts is difficult and often not accomplished properly. Improperly torqued bolts are often sheared during operation of the vehicle. These problems have existed for approximately twelve years, even since LAV or similar vehicles have been in service.

SUMMARY

Our invention is an improved assembly of a bracket and pin which facilitates replacement of shock absorbers on vehicles such as the LAV. Our assembly eliminates the steps or raising the vehicle on a hoist, removing a tire and a wheel spider and removing the assembly from the road arm. The assembly includes a pin, flange on the pin bearing against the outboard surface of the bracket and a threaded fastener fixing the flange to the bracket.

DETAILED DISCUSSION

Figure 1:
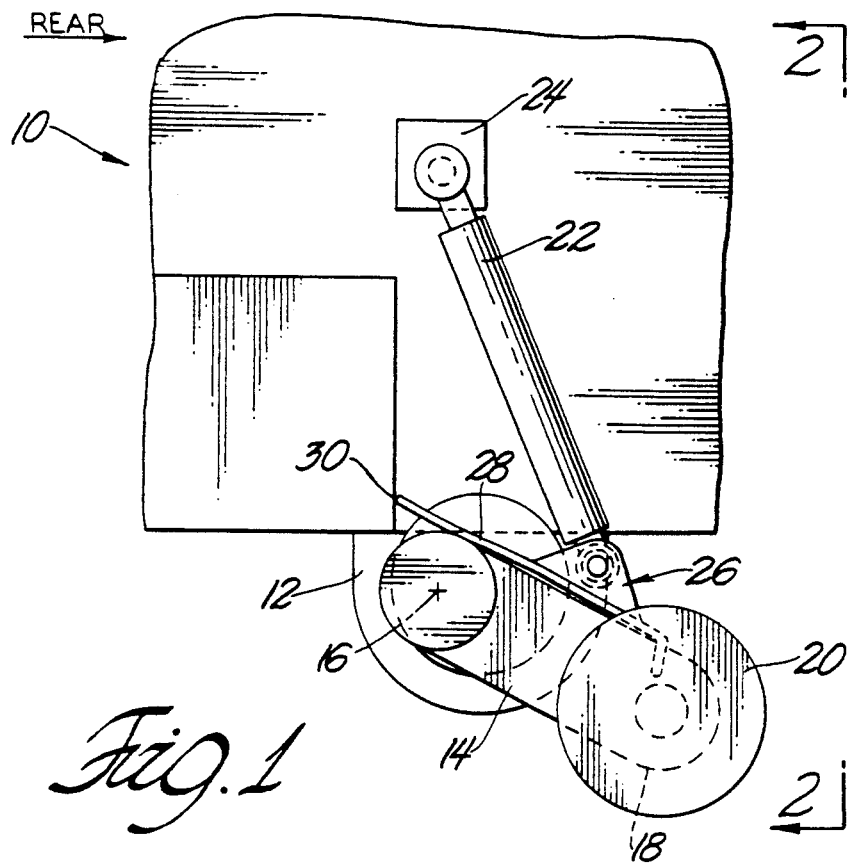
FIG. 1 is a side elevational view of a vehicle zone where a road arm for a wheel unit is located, the tire and wheel spider being omitted.
Figure 2:
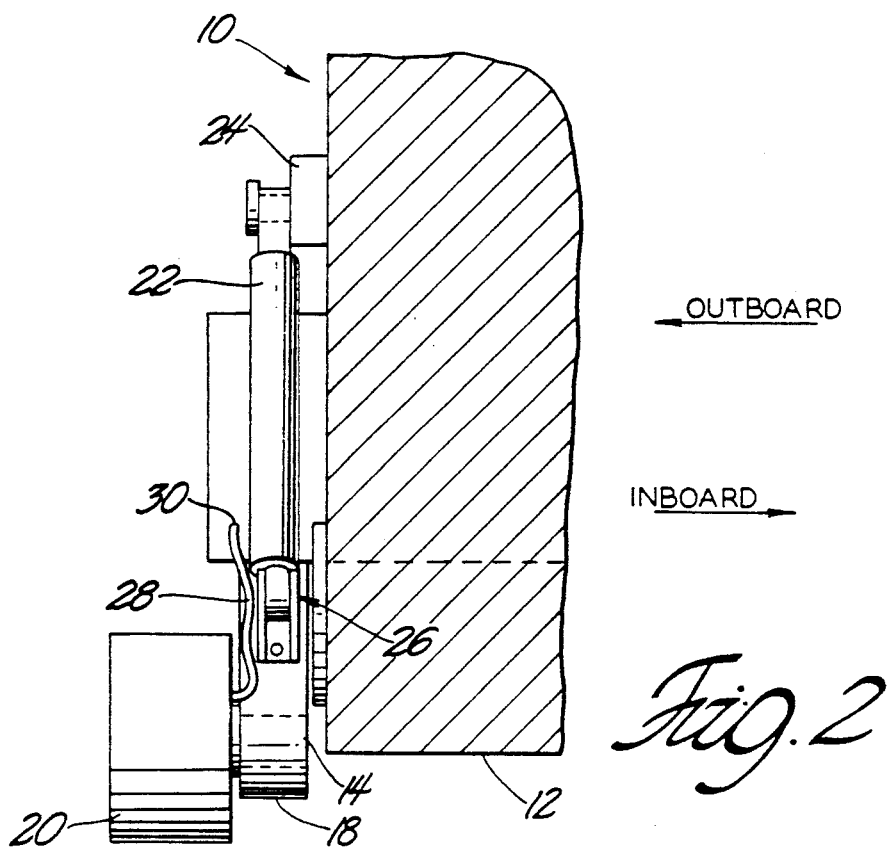
FIG. 2 is sectional view taken along line 2-2 in FIG. 1.

FIGS. 1 and 2 illustrate a portion of a vehicle where our bracket/pin assembly is located, the vehicle being designated as reference numeral 10. Fixed to the underside of vehicle 10 is a chassis element 12 to which a road arm 14 is rotatably mounted about axis 16. Chassis element 12 can be a housing through which extends a pivot rod (not shown) rotatable about axis 16 and having road arm 14 fixed to the rod. At the lower, rear end 18 of road arm 14 is rotatably mounted a wheel element 20, this element typically being a wheel hub or a spindle. The remainder of the wheel assembly and the vehicle tire are omitted. A shock absorber 22 is disposed between road arm 14 and mount 24 on vehicle 10. The shock absorber is connected at its lower end to road arm 14 by assembly 26, which includes a pin in a bracket fixed to the road arm. Typically, one or more brake lines 28 extend from location 30 on the vehicle, run along road arm 14 outboard of assembly 26 and connect to wheel element 20. When vehicle 10 passes over a bump in the surface upon which it is travelling, road arm pivots upward about axis 16 and compresses shock absorber 22.

Figure 3:
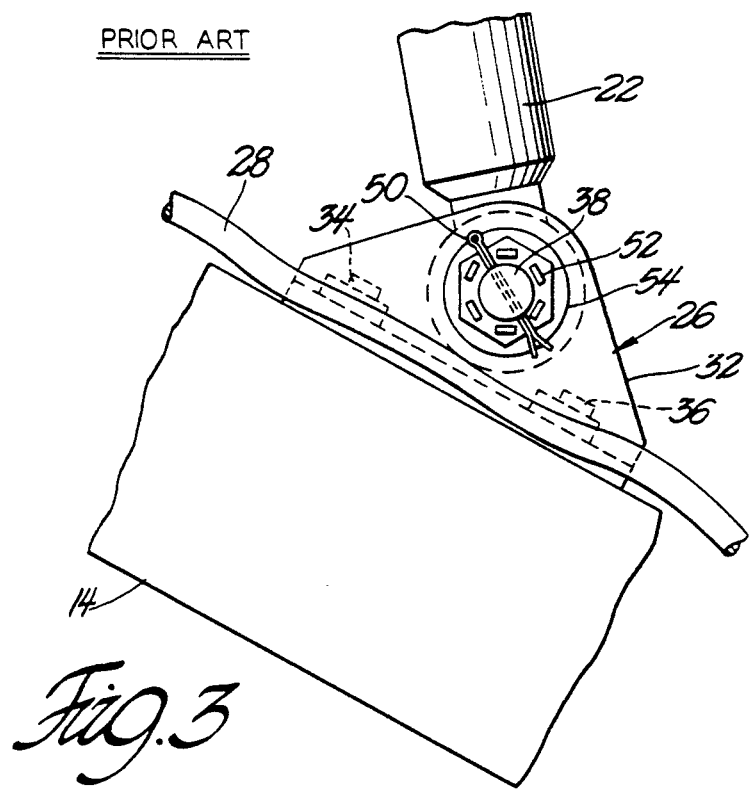
FIG. 3 is a side elevational view of a conventional bracket assembly connecting a shock absorber to the road arm.
Figure 7:
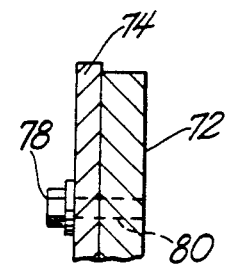
FIG. 7 is a detail sectional view showing the portion of our pin and bracket engaged by a screw.
Figure 5:
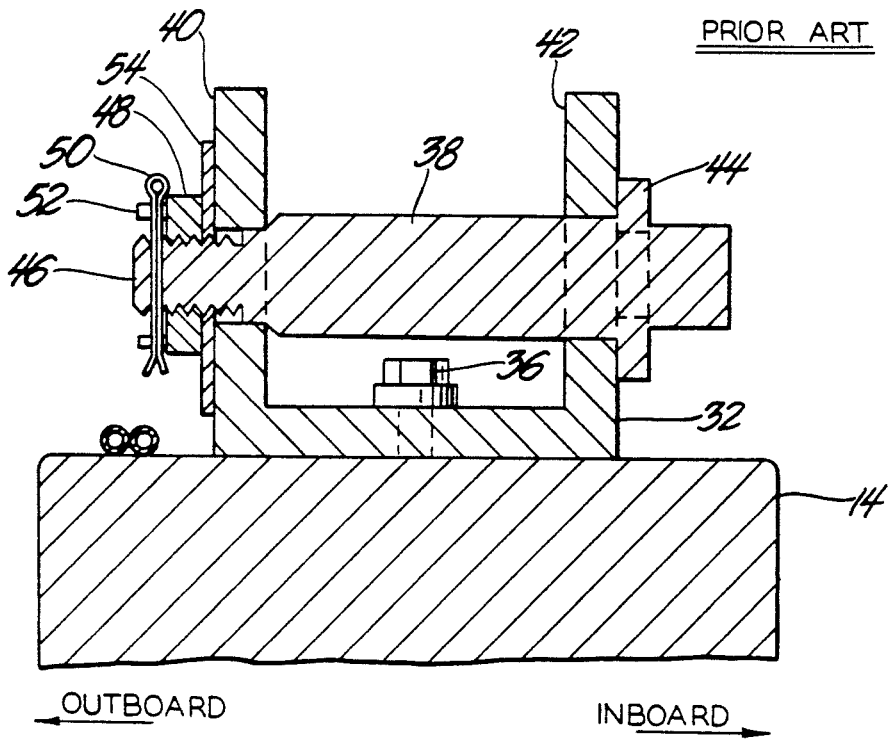
FIG. 5 is a sectional view of a convention bracket and pin fixed to a road arm, the shock absorber being omitted for the sake of clarity, FIG. 5 having two hydraulic lines instead of the single brake line seen in FIG. 1.

FIG. 3 shows a detail view of a conventional bracket assembly 26 and structure to which it attaches. A cross-sectionally U-shaped bracket 32 (also FIG. 5) is fixed to the upper surface of road arm 14 by bolts 34 and 36. A pin 38 passes through sides walls 40 and 42, the pin having an annulus 44 bearing against the inboard surface of wall 42. The outboard end 46 of pin 38 passes through side wall 40 and washer 54, and is threaded to accommodate castle nut 48 by which pin 38 is held in bracket 32. A cotter pin 50 extends through end 46 and lies between merlons 52 of castle nut 48 so as to lock castle nut 48 in its position on pin 38. In conjunction with FIGS. 3 and 5, it can be seen that access to both the inboard and outboard ends of pin 38 is necessary to remove it from bracket 32. In vehicles where bracket 32 and pin 38 are now used, such access is difficult or impossible, so that bracket 32 must be removed from road arm 14 and piston 22 moved before pin 38 can be extracted from bracket 32. Replacement of shock absorber 22 is therefore a relatively difficult process. Also, accessing bolts 34 and 36 is so troublesome that properly torquing them to re-attach bracket 32 onto arm 14 is not feasible. Empirical experience shows that improper torque on bolts 34 and 36 causes them to shear during vehicle operation, thereby detaching the road arm from the shock absorber.

Figure 4:
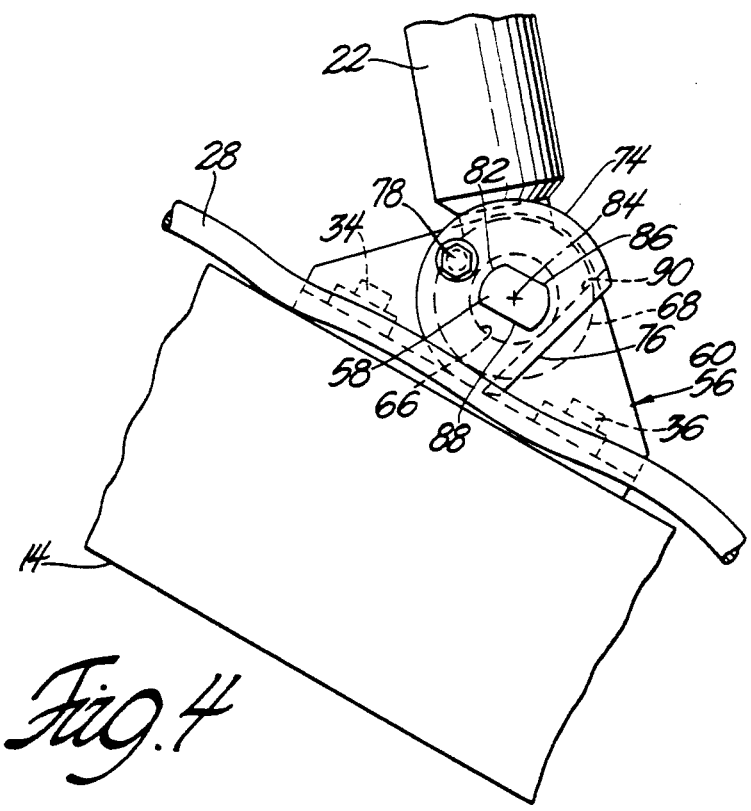
FIG. 4 is a side elevational view of our improved bracket assembly connecting a shock absorber to the road arm.
Figure 6:
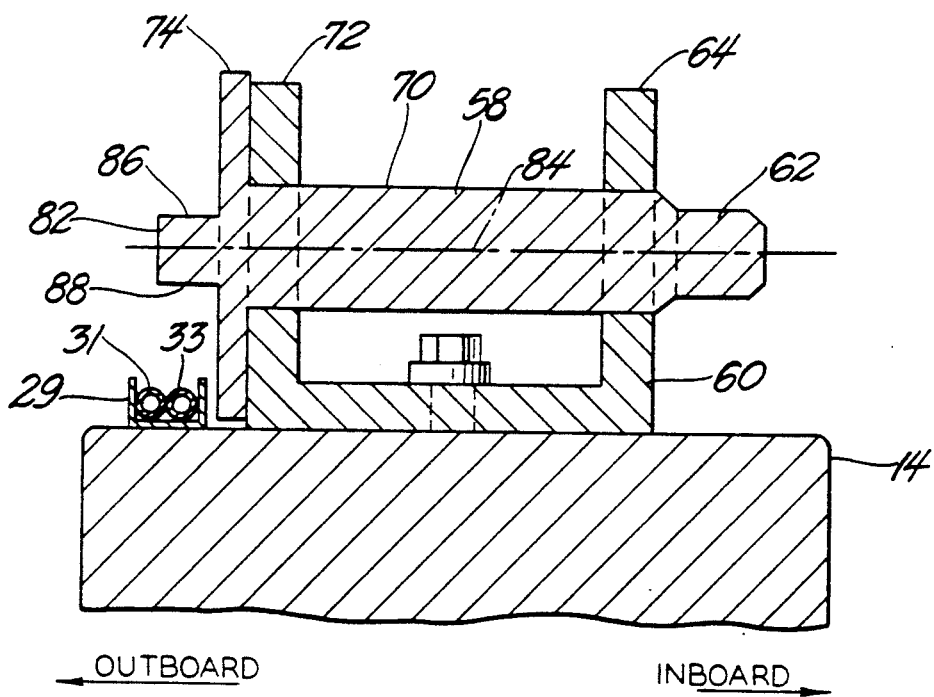
FIG. 6 is a sectional view of our improved bracket and pin fixed to a road arm, the shock absorber being omitted for the sake of clarity, FIG. 6 having two hydraulic lines routed through a channel segment instead of the single brake line seen in FIG. 2.

FIG. 4 shows our bracket assembly 56, which will replace conventional bracket assembly 26 in FIG. 3. The common elements in FIGS. 3 and 4 will have the same reference numerals, but elements of the respective bracket assemblies will have different reference numerals. Pin 58 and bracket 60 in FIG. 4 are also shown in FIG. 6.

Pin 58 enters bracket 60 from the outboard side, the inboard end 62 of the pin closely and rotatably fitting through side wall 64 of the bracket. The intermediate portion 70 of pin 58 is between side walls 64 and 72, and closely fits within inner diameter 66 of shock absorber eye 68. The intermediate portion may preferably have a slight inboard-to-outboard taper of between 0.1 and 0.4 degrees relative to axis 84. Thus the force of inner diameter 66 bearing against intermediate portion 70 will tend to force pin 58 inboard and keep pin 58 in bracket 60.

At the outboard end of pin 58 and integral therewith is a disk-like flange 74 whose inboard surface bears against the outboard surface of sidewall 72. During the manufacture of pin 58, the inboard surface of flange 74 and the outboard surface of side wall 72 may be roughened. These surfaces will be rougher than, say, the outboard surface of the flange or the surface of intermediate section 70, whereby a clamping force holding flange 74 against side wall 72 results in greater frictional resistance to rotation of the flange upon side wall 72.

It is contemplated that pin 58 will be placed in bracket 60 while bracket 60 is fastened to road arm 14. Flange 74 will preferably have a chordal flat 76 (FIG. 4) which will face toward the upper surface of road arm 14 when pin 58 is axially inserted through side walls 72 and 64. In this manner, flange 74 will clear brake line 28 or a similarly located element when the pin is inserted into bracket 60. Such a similarly located element is exemplified by a channel section 29 for routing a pair of fluid lines 31 and 33 as shown in FIG. 6, these latter elements optionally replacing brake line 28. After the pin is inserted into the bracket, the pin and flange can be rotated so that brake line 28 will interfere with outboard movement of the pin and flange. The brake line or similarly located element will thus act as a means to prevent the escape of pin 58 from bracket 60.

Flange 74 has a screw 78 that protrudes through the flange and through side wall 72, the inboard end of screw 78 preferably flush with the inboard surface of side wall 72. It is preferred that the hole for the screw in flange 74 registers with the hole for the screw in side wall 72 when flange is turned such that channel section 29 interferes with axial outboard movement of the flange as discussed previously. It is preferred that only shaft portion 80 of screw 78 will be threaded and shaft portion 80 engages complimentary threads in the screw hole of side wall 74. Screw 78 is located between a curved portion of the periphery of flange 74 and axis 84 of pin 58, the screw preferably being closer to the curved portion than to axis 84 so as to guarantee sufficient leverage for the screw to resist rotation of flange 74. Of course, screw 78 prevents outboard axial translation of pin 58.

Figure 8:
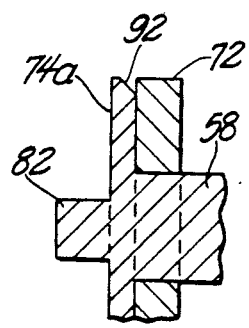
FIG. 8 is a detail view of the flange on our pin showing an optional bevel on the outer peripheral edge of the flange.

In FIG. 8 is a partial sectional view of pin 58 and bracket 60 wherein flange 74a replaces flange 74. Flange 74a has a bevel 92 on the curved portion of the periphery, the bevel and the outboard surface of side wall 72 together defining a cross-sectionally V-shaped groove. Once screw 78 has been removed from the flange, the groove will facilitate use of a wedged tool such as a screw driver head to force flange 74a away from side wall 72. Optionally, chordal flat 76 may also have a bevel faced toward bracket 60 as shown at 90 in FIG. 4. A portion of bevel 90 will be closer to axis 84 than is bevel 92, whereby the wedging effect of a tool inserted between bevel 90 and side wall 72 is less likely to cause pin 58 to bind in bracket 60 than the wedging effect of a tool inserted at bevel 92.

The outboard end of pin 58 has a knob 82 integral therewith, the knob being disposed adjacent flange 74 on an extension of rotational axis 84 of pin 58. Knob 82 has opposed flat surfaces 86 and 88 parallel to one another and to axis 84, these surfaces being suitable for gripping by a pair of pliers or like tool, the knob being used to turn flange 74 as desired.

METHOD OF USE

Our improved assembly of bracket 60 and pin 58 permits an improvement over the prior method of removing and replacing shock absorbers for road arms on vehicle such as the U.S. Army's Light Armored Vehicle (LAV). The prior method requires lifting the vehicle on a hoist, removing the tire and wheel spider, unbolting bracket assembly 26 and swinging shock absorber counterclockwise as seen in FIG. 1. These steps are necessary to access the inboard side of bracket assembly 26 which is normally very close to chassis element 14 as seen in FIGS. 1 and 2. Subsequent steps include removal of castle nut 48, and then translating pin 38 inboard to remove it from bracket 32 so that bracket 32 can be separated from shock absorber 22. Shock absorber 22 is then removed from mount 24 in a well known manner, a new shock absorber is connected thereto and bracket assembly 26 is placed on the new shock absorber. Bracket assembly 26 is rebolted to road arm 14, this being difficult to do properly because shock absorber 22 hinders access to bolts 34 and 36. In practice, bolts 34 and 36 are often improperly torqued, whereby the bolts shear off during the operation of the vehicle.

The improved method using our bracket assembly 56 does not require lifting a vehicle on a hoist or removing the tire and wheel spider. Screw 78 is removed from the outboard side of the bracket assembly, flange 74 is rotated as necessary before pin 58 is translated outboard out of bracket 60 and shock absorber 22 is disconnected from mount 24. Installing a new shock absorber is the reverse of the removal process. It will be noted that access to the inboard side of bracket assembly 56 is unnecessary and bracket 60 need not be removed from road arm 14. It is thus possible to have bracket 60 welded to or integral with road arm 14.

We wish it to be understood that we do not desire to be limited to the exact details of construction shown and described herein since obvious modifications will occur to those skilled in the relevant arts without departing from the spirit and scope of the following claims.

We claim:

1. A mechanism for rotatably connecting one element to another element, the mechanism comprising:

a bracket fixed to the one element;

a pin extending through the other element and through the bracket, a rotational axis of the pin fixed relative to the bracket;

a single flange on the pin facing a single bracket surface wherein the single surface is on the exterior of one side of the bracket;

a fastener engaging the flange and fixing the flange relative to the one side;

a second side of the bracket having a circular aperture;

an end of the pin engaged with the aperture, no portion of the end having a greater diameter than the aperture, the end contacting no elements other than the aperture and a remainder of the pin.

2. An assembly to pivotally connect a shock absorber to a road arm of a vehicle, the assembly comprising:

a bracket fixed to the road arm;

an inboard side wall and an outboard side wall on the bracket;

a pin ending along an inboard-to-outboard axis through the side walls, the pin fitting closely and rotatably with the side walls;

anti-translation means to prevent the axial movement of the pin from the bracket, the anti-translation means located only on a single surface of the outboard side wall of the bracket.

3. The assembly of claim 2 wherein the anti-translation means comprises:

a flange connected to the pin, a bearing surface of the flange faced against and exterior surface of the bracket on the outboard side wall;

a fastener on the flange, the fastener having a shank fixed to the outboard side wall.

4. The assembly of claim 3 including a knob on the flange centered on the inboard to outboard axis, the knob defining two flats parallel to each other and the inboard-to-outboard axis.

5. The assembly of claim 3 wherein a peripheral edge of the flange comprises:

an arcuate portion centered on the inboard-to-outboard axis;

a chordal straight portion less distant from the inboard-to-outboard axis than the arcuate portion.

6. The assembly of claim 5 wherein the chordal straight portion has an edge bevel faced toward the bracket.

7. The assembly of claim 6 wherein the arcuate portion has another bevel faced toward the bracket.

8. The fastener of claim 3 wherein:

the flange has a roughened surface faced against the exterior surface of the bracket;

at least part of the exterior surface is roughened, thereby increasing frictional resistance to sliding of the flange on the bracket.

9. The assembly of claim 2 wherein the road arm has a structural element thereon outboard of an opposed to the bracket such that the structural element and the bracket define a space therebetween, the flange has a first rotational position wherein a portion of the flange is in the space, and the flange has a second rotational position wherein no part of the flange is in the space, whereby the outboard translational path of the flange clears the structural element.

* * * * *